March 21, 1933.  G. S. MAYNARD  1,902,308
PIN FASTENER
Filed June 25, 1931
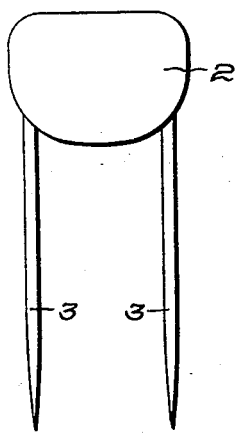
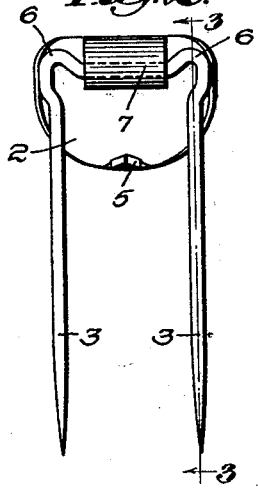
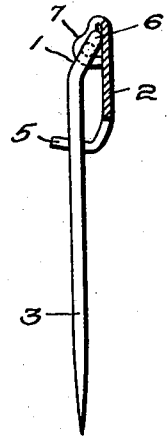
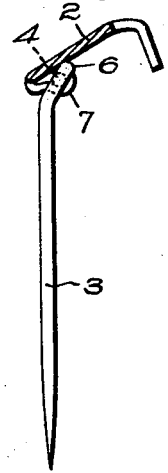
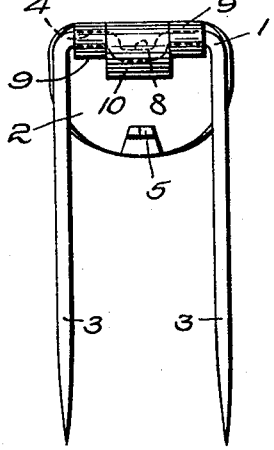
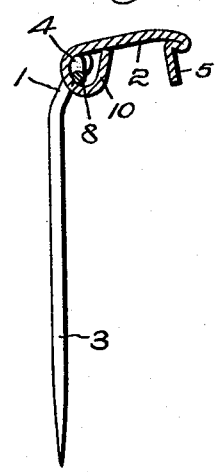
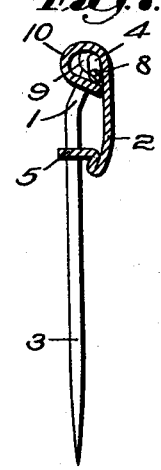
Inventor:
George S. Maynard
by Emery, Booth, Varney & Townsend
Attys Patented Mar. 21, 1933

1,902,308

UNITED STATES PATENT OFFICE

GEORGE S. MAYNARD, OF NEWTONVILLE, MASSACHUSETTS, ASSIGNOR TO UNITED-CARR FASTENER CORPORATION, OF CAMBRIDGE, MASSACHUSETTS, A CORPORATION OF MASSACHUSETTS

PIN FASTENER

Application filed June 25, 1931. Serial No. 546,732.

My invention aims to provide improvements in pin fasteners particularly, though not exclusively, useful in connection with the attachment of slip covers to upholstery.

In the drawing which illustrates preferred embodiments of my invention:—

Figure 1 is a front elevation of a preferred form of my pin fastener;

Fig. 2 is a rear elevation of the pin fastener;

Fig. 3 is a section taken on the line 3—3 of Fig. 2 showing the hinged plate in pronglocking position;

Fig. 4 is a vertical section through the pin fastener similar to that shown in Fig. 3 and showing the hinged plate in unlocked position;

Fig. 5 is a rear elevation of a second pin fastener showing another form of detent means;

Fig. 6 is a section taken on the line 6—6 of Fig. 5, but showing the hinged plate in unlocked position; and Fig. 7 is a section on the line 6—6 of Fig. 5.

The pin fasteners illustrated by the drawing are improvements over the well known types of pin fasteners which have been used to a large extent for securing slip covers to upholstery installations.

My improved fasteners are easy to attach and detach and may be securely locked in place in a very simple and effective manner without injury to the material during attachment or detachment and with greater ease because of their construction and operation.

In the devices selected for illustration each has an attaching part 1 and a plate part 2 hinged to the attaching part. The attaching part 1 is made of wire and has two sharp pointed parallel legs 3 connected at one end by a portion 4. The plate part 2 is hinged in a suitable manner (according to the construction of the detent means) to swing relative to the attaching portion for purposes hereinafter described. The plate part 2 has means in the form of a sharp pointed stabbing prong 5 extending from the lower end of the plate part for securing the fastener to a slip cover or like structure.

Each pin fastener is provided with detent means formed partly by the attaching part and partly by the plate part and is adapted to hold the plate part in locked position when the prong 5 is forced into the material to which the pin is attached.

Referring now to the detent structure used as a part of the device shown in Figs. 1 through 4, inclusive, I have provided loop portions 6—6 in the attaching part (Fig. 2) adjacent to where the legs 3 join the connecting portion 4. Between the portions 6—6 the portion 4 is bent downwardly (Figs. 2 and 3) and a hinge portion 7 formed integral with the plate is engaged therewith. Thus, the two parts of the fastener are secured together in hinged relation. By arranging the loops 6—6 so that the distance from the center of the hinge to the plate in the direction of the angle of the loops is greater than the distance from the hinge to the plate at right angles to the legs 3 I provide a cam action when the plate 2 is moved about the pivot provided by the downwardly bent portion of the connecting portion 4. This provides a sort of detent cam action which is utilized to hold the plate 2 in the position shown in Figs. 1, 2 and 3.

In the embodiment of my invention illustrated by Figs. 5, 6 and 7 of the drawing I have shown the detent means as being formed in what might well be termed a reverse order from that shown in Figs. 1 through 4. A loop 8 is formed in the connecting portion 4 of the attaching part midway between the legs 3. The hinged plate 2 has two hinges 9—9 engaging the connecting portion between the legs 3 and the loop 8, as best shown in Fig. 5.

Between the hinges 9—9 I have provided as a part of the plate 2 a finger 10 which is looped over the loop 8 and shaped to prevent movement of one relative to the other for any substantial distance without one yielding relative to the other. Thus I have provided a cam action between the loop 8 and the finger 10 which is used to hold the plate part 2 securely in a position shown in Fig. 7.

It will be seen that I have provided detent means which receive their cam actions either by a yielding action of the legs 3—3 relative to each other, as in the construction shown in Figs. 1 through 4, or by a yielding action of the finger 10, as shown in Figs. 5 through 7. Of course, it is understood that I may construct devices using a combination of these actions.

To attach either fastener to an upholstered structure, the plate is first swung into an unlocked position substantially at right angles to the legs 3, as shown in Figs. 4 and 6. Then with the plate part 2 grasped between the thumb and the first and second fingers the sharp pointed legs 3 may be easily forced through the slip cover or like structure and into embedded relation with the upholstery. Thereafter the plate part 2 is pressed toward the slip cover and the prong 5 is forced through the slip cover and into the upholstery, thereby locking the fastener against accidental withdrawal. During the latter part of the attaching operation the cam action takes place in the detent means and the plate 2 is securely locked in position and cannot accidentally be brushed into unlocking position.

When the fastener is attached as above described it is held securely in position and the prong 5 prevents the legs 3 from pulling out of the upholstery when lateral stress is exerted. To remove the fastener it is merely necessary to lift the lower edge of the plate part 2, thereby pulling the prong portion 5 free from the installation. Thereafter the plate part 2 may be grasped and the pin removed by exerting an upward pull thereon.

My invention is durable, simple in construction and is arranged to provide a very desirable device for simple and efficient use. It is preferably made of two pieces and the plate 2 is formed with the hinges, prong and finger in such a manner that they are concealed by a neat and preferably imperforate front portion.

While I have illustrated and described preferred embodiments of my invention, I do not wish to be limited thereby, because the scope of my invention is best defined by the following claims.

I claim:

1. A pin fastener comprising, in combination, an attaching part having pin means for securing the fastener to a structure to be fastened thereby, a plate part hinged to said attaching part at its upper end and concealing the entire upper end portion of the attaching part and said plate part having a stabbing prong extending therefrom toward said attaching part and concealed locking means provided partly by the plate part and partly by the attaching part adjacent to the connection between the plate part and the attaching part to hold the plate part in locked position when the fastener is attached to a structure and the stabbing prong is engaged therewith.

2. A pin fastener comprising, in combination, an attaching part 1, a plate part 2 hinged thereto and having a stabbing prong 5 extending therefrom toward said attaching part and detent means provided to hold the plate part in locked position when the fastener is attached to a structure and the stabbing prong is engaged therewith, said detent means comprising spaced loop portions 6—6 provided on the attaching part adjacent to where the plate part 2 is hinged to the attaching part and a hinge 7 securing said plate part 2 to the attaching part 1 between the loop portions 6—6 in such a manner that the ends of the loops 6—6 make camming engagement with the plate 2 during a hinging movement of the plate 2 relative to the attaching part 1.

3. A pin fastener comprising, in combination, an attaching part 1 having pointed leg portions 3—3 connected together by a portion 4, a plate part 2 hinged to the connecting portion 4 and having a stabbing prong 5 extending therefrom toward said attaching part and detent means provided to hold the plate part in locked position when the fastener is attached to a structure and the stabbing prong is engaged therewith, said detent means comprising a loop 8 provided in the connecting portion 4 and a yieldable finger 10 extending from said plate part 2 and looped around said loop 8 and shaped to cooperate therewith in a cam-like action when said plate part 2 is moved in a hinging action relative to said attaching part 1.

In testimony whereof, I have signed my name to this specification.

GEORGE S. MAYNARD.